(12) United States Patent
Gilliard et al.

(10) Patent No.: US 6,174,479 B1
(45) Date of Patent: Jan. 16, 2001

(54) PROCESS FOR PROCESSING A SEMICRYSTALLINE THERMOPLASTIC

(75) Inventors: Pierre Gilliard, Brussels; Claude Dehennau, Waterloo, both of (BE); Petrus J. A. Karsten, Enkhuizen (NL)

(73) Assignee: Solvay (Societe Anonyme), Brussels (BE)

(*) Notice: Under 35 U.S.C. 154(b), the term of this patent shall be extended for 0 days.

(21) Appl. No.: 08/931,838

(22) Filed: Sep. 17, 1997

(30) Foreign Application Priority Data

Sep. 30, 1996 (BE) .................................. 09600819

(51) Int. Cl.$^7$ .................................... B29C 47/06
(52) U.S. Cl. ................... 264/173.16; 264/173.19; 264/210.2; 264/284; 264/293; 264/342 RE
(58) Field of Search .................. 264/210.2, 210.6, 264/210.1, 173.12, 173.14, 173.15, 342 RE, 235, 284, 293, 173.16, 173.19

(56) References Cited

U.S. PATENT DOCUMENTS

| | | | |
|---|---|---|---|
| 3,925,302 | * 12/1975 | Magder et al. | 264/293 |
| 4,148,972 | * 4/1979 | Yamane et al. | 264/173.14 |
| 4,311,660 | * 1/1982 | Barham et al. | 264/342 RE |
| 4,603,174 | 7/1986 | Okada et al. | |
| 4,668,463 | * 5/1987 | Cancio et al. | 264/210.1 |
| 5,306,796 | 4/1994 | Gilliard . | |
| 5,932,150 | * 8/1999 | Lacey | 264/284 |

FOREIGN PATENT DOCUMENTS

| | | |
|---|---|---|
| 0509580 | 10/1992 | (EP) . |
| 0743163 | 11/1996 | (EP) . |
| 1211161 | 3/1960 | (FR) . |
| 836 542 | * 1/1960 | (GB) . |
| 63-039329 | 2/1988 | (JP) . |
| 05345843 | 12/1993 | (JP) . |

\* cited by examiner

*Primary Examiner*—Mathieu D. Vargot
(74) *Attorney, Agent, or Firm*—Venable

(57) ABSTRACT

A process for preparing thermoplastics comprising the steps of cooling an extrudate to a temperature $T_1$, drawing the molten extrudate, relaxing the extrudate at a temperature $T_3$ for a duration of at least the average relaxation time of the thermoplastic at the relaxation temperature, and quenching the extrudate to a temperature $T_4$. The process enables the manufacture of films consisting of at least one propylene homopolymer with a thickness of 100 to 250 μm and having a hot shrinkage of at most 20%, a haze of less than or equal to 3% and a total transparency with respect to air of greater than 70%.

8 Claims, No Drawings

US 6,174,479 B1

PROCESS FOR PROCESSING A SEMICRYSTALLINE THERMOPLASTIC

BACKGROUND

The present invention relates to a process for processing a thermoplastic, enabling highly transparent articles, in particular films, to be manufactured. It also relates to special films which can be obtained by this process.

Transparent films constitute a very extensive application of thermoplastics, especially in the field of packaging. In particular, by way of example, among the polymers used for manufacturing transparent films, propylene polymers occupy an increasing place.

Improving the transparency of films, which remains a constant objective of the industries in question, may not only be achieved by optimizing the chemical nature of the polymers but also by the choice of particular processing conditions. As a general rule, the transparency of semicrystalline polymers may be increased by reducing their crystallinity and/or the size of their crystallites.

With regard to the chemical nature of the compositions used, techniques known for this purpose are in particular the addition of a comonomer so as to obtain a less crystalline random copolymer, or the addition of a nucleating agent (talc, etc.) which reduces the size of the crystallites and increases their number. With regard to the processing conditions, conventional techniques consist in particular in drawing the film in the solid state so as to break up the crystallites (for example, in the case of biaxially oriented films), or else by very rapidly cooling the films (quenching) immediately after their manufacture, so as to reduce the size of the crystallites and simultaneously to reduce the crystallinity of the polymer. However, in the latter case, the crystallinity will tend to increase over time, and will do so all the more rapidly if the film is reheated.

Several methods have already been proposed for the purpose of improving certain mechanical and optical properties of thermoplastic-based films. Thus, in the document FR 1,211,161, such a film, manufactured beforehand, is reheated above its melting point ($T_f$), then cooled between $T_f-12°$ C. and $T_f$, then drawn at least 150% at this temperature, and finally cooled to at least 75° C. under tension.

A drawback of this process is that it requires a separate step to manufacture the film, followed by a reheating step, this being highly disadvantageous within the framework of industrial exploitation.

BRIEF SUMMARY

The present invention therefore aims to provide a process which is simple to employ and which makes it particularly possible to manufacture flat thermoplastic-based articles having improved optical properties, in particular transparency.

More specifically, the invention relates to a process for processing a semicrystalline thermoplastic, which includes, in succession, the following steps:

(1) a molten semicrystalline thermoplastic extrudate is cooled to a temperature $T_1$ which is greater than the crystallization temperature ($T_c$) of the thermoplastic and less than $T_f+5°$ C., $T_f$ denoting the melting point of the thermoplastic;
(2) next, the extrudate is drawn in the molten state;
(3) next, the extrudate is relaxed, at a temperature $T_3$ which is between $T_c$ and $T_f$, for a duration of at least equal to the average relaxation time ($\tau_3$) of the thermoplastic at the relaxation temperature and after the drawing;
(4) next, the extrudate is quenched to a temperature $T_4$ which is less than $T_c$.

DETAILED DESCRIPTION

This process makes it possible to manufacture flat articles such as films (having a typical thickness of the order of a hundred $\mu$m) or sheets (having a typical thickness of the order of a millimeter). For reasons of simplicity, the specific details of the process of the invention will essentially be described within the context of the manufacture of such flat articles, although this process also makes it possible to manufacture any other article of constant cross-section, such as a bar, profile, pipe, etc., by means of a few modifications obvious to those skilled in the art.

Conventionally, the prior step of melting the thermoplastic takes place at a temperature well above its melting point ($T_f$). Such prior melting may be carried out by means of any known device, such as an extruder or mixer. The mass of thermoplastic produced, generally continuously, by this device will be termed the extrudate, even if an extruder is not involved.

Compared with the prior known process mentioned above, the process thus proposed is simpler given that it is carried out starting from a molten thermoplastic and does not require a prior step of forming the article and a subsequent step of reheating the latter. The proposed process is furthermore distinguished by the presence of a high-temperature relaxation step (3) followed by a short and vigorous cooling (4), whereas, according to the previously known process, the film is simply left to cool naturally, and under tension.

It will be recalled that the melting point ($T_f$) and crystallization temperature ($T_c$) correspond to the endothermic and exothermic peaks measured by differential scanning calorimetry (DSC), respectively during heating and cooling, of the thermoplastic in question, in the absence of any external stress.

The thermoplastic is semicrystalline, that is to say that it comprises at least 50% by weight of one or more semicrystalline thermoplastic polymers, such as, for example, polyolefins or polyvinylidene fluoride. It may furthermore include a minor proportion of one or more other thermoplastic polymers, as well as, optionally, modest amounts of additives such as antioxidants, stabilizers, pigments, etc. Preferably, the thermoplastic includes at least one polyolefin. More particularly preferably, the thermoplastic material includes at least 50% by mass of one or more polyolefins. Ideally, the thermoplastic essentially consists of one or more polyolefins. A propylene polymer may advantageously be used as the polyolefin. Excellent results have been obtained with ethylene-propylene copolymers, as well as with propylene homopolymers.

The cooling (1) of the extrudate preferably takes place at a temperature $T_1$ less than $T_f$, this cooling may be carried out in any known manner, for instance by contact with at least one chill roll placed in the immediate vicinity of the device from which the extrudate leaves. This roll may, for example, be cooled by the internal circulation of a fluid maintained at the appropriate temperature by a thermal conditioning device. In order to reduce the cooling time, it is advantageous to cool both sides of the extrudate, for example on two consecutive conditioned rolls, the extrudate describing an S-shaped path. Instead of a single roll, it is also possible to use a pair of rolls pinching the extrudate, when this is in the form of a strip. The drawing (2) may be carried out in any known manner, for instance by exerting tension on the extrudate by means of a roll or a pair of rolls, this or these being placed downstream and driven by a motor whose speed is judiciously controlled. Good results are obtained if the draw ratio during step (2) is at least 200% and preferably at least 300%. When at least one roll is used for each of the cooling (1) and drawing (2) steps, the draw ratio is approximately the ratio of the peripheral velocities of the roll or rolls used for the cooling (1) and of the roll or rolls used for the drawing (2).

The drawing conditions are advantageously such that the velocity gradient is at least $1/(20\tau_0)$ where $\tau_0$ denotes the average relaxation time of the thermoplastic at the extrusion temperature ($T_0$) in the absence of any drawing stress. Preferably, this velocity gradient is at least $1/(10\tau_0)$. The relaxation time $\tau_0$ is defined by the $$\tau_0 = \frac{2\eta_0 M_c}{\rho R T_0}$$

relationship:
in which $\eta_0$ denotes the dynamic viscosity of the thermoplastic for velocity gradients tending towards 0, $\rho$ is its density, $M_c$ is the critical (weight-average) molecular mass above which $\eta_0$ is proportional to the power 3.4 of the molecular mass, and R and $T_0$ denote the ideal gas constant and the absolute extrusion temperature (at the die exit).

The drawing may be uniaxial or biaxial; however, it is preferably uniaxial, that is to say that the extrudate more or less maintains its initial width, a slight transverse necking being, however, possible.

The region where the extrudate is undergoing this drawing is advantageously protected from undesirable temperature variations, in particular draughts; optionally, this region is equipped with heating means, for example infrared heating means, enabling the thermoplastic to be maintained at the required temperature.

An important characteristic of the process of the invention is that the drawing (2) takes place while the thermoplastic is still in the molten state. This does not necessarily mean that the temperature $T_2$ at which the drawing takes place is greater than $T_f$. This is because, within the temperature range lying between $T_c$ and $T_f$, a semicrystalline thermoplastic may indifferently be in the molten or solid state, depending on its thermal history. In general, within this range, a semicrystalline thermoplastic will be in the molten state if it has been cooled from a temperature above $T_f$, and in the solid state if it has been heated from a temperature below $T_c$. In the process of the present invention, it is the first of these two cases which is adopted; the drawing generally takes place at a temperature ($T_2$) lying between $T_c$ and $T_f+5°$ C., preferably less than $T_f$.

According to a very simple variant of the process, the drawing takes place approximately at the temperature $T_1$ of the cooling (1), without either additional cooling or reheating.

When it is carried out under the conditions indicated, the drawing causes very extensive crystalline nucleation of the thermoplastic, greater by several orders, in terms of the number of crystallites, than heterogeneous nucleation (by means of talc, etc.).

Furthermore, the drawing conditions are such that no inversion of $T_c$ and $T_f$ occurs, contrary to what is generally the case when a thermoplastic is biaxially oriented in an extrusion die, when it is subjected to enormous stresses.

Any relaxation of a thermoplastic is intended in general to reduce its internal tensile stresses, in particular those of its amorphous phase, and thus the extent of any subsequent shrinkage in the case of reheating. However, within the scope of the process of the present invention, a relaxation seems a priori to have little to recommend it, given that there is a risk of it causing the benefit of the drawing step (2) to be lost and thus the transparency of the manufactured articles to be reduced.

Surprisingly, however, it has been found that the specific relaxation conditions mentioned above enabled the benefit of the drawing step (2) to be maintained while still reducing the magnitude of any subsequent shrinkage of the articles during their use.

Preferably, the relaxation (3) takes place at a temperature $T_3$ greater than $T_c+5°$ C. Advantageously, it takes place at a temperature less than $T_f-5°$ C. The duration of the relaxation may be chosen depending on the desired rigidity of the article manufactured: a longer duration of relaxation will lead to a lower rigidity. Preferably, this duration is at least $2\tau_3$. The value of $\tau_3$ is calculated as indicated above, by replacing $T_0$ by $T_3$ (absolute temperature) (therefore neglecting any variations in $\eta_0$ and in $\rho$). Moreover, the duration of the relaxation is advantageously at least 1 s, preferably at least 2 s.

Preferably, the relaxation takes place at constant dimensions and in the absence of any external stress. In the case of the manufacture of flat articles, it may, for example, take place on the surface of a roll maintained at the appropriate temperature, located downstream of the drawing device (for example, the drawing roll). According to an advantageous variant, the relaxation takes place on the roll which exerts a tensile force on the extrudate in order for it to undergo drawing (2), which makes it possible to save on one roll. In this case, it is inevitable that a certain portion of the extrudate in contact with the roll, lying on the "upstream" side, i.e. in the direction of the device from which the extrudate leaves, can slip with respect to the roll and thus be subjected to drawing stresses. The length of this portion is generally less than 1 cm. On the other hand, that part of the extrudate which lies downstream of this portion is not subjected to any drawing stress; under the usual industrial conditions, its length is generally at least 20 cm. It is preferable to ensure that the total length of extrudate in contact with the drawing roll is sufficiently great so that only a small proportion of the extrudate in contact with this roll is subjected to drawing stresses. If a particularly long duration of relaxation is desired, it is possible to use a larger diameter roll or to use several consecutive rolls.

It should be noted that such a relaxation cannot be achieved inside an extrusion die because of the high shear stresses which the thermoplastic would be subjected to therein.

An advantageous variant of the process of the invention consists in combining with it, prior to the relaxation step (3), a step of embossing the extrudate, in which the latter is pinched between two metal rolls, preferably having a high hardness (a Vickers hardness preferably greater than 150 HV), for example consisting of or coated with steel or cast iron. At least one of these rolls must be sand-blasted or etched on at least part of its surface so as to produce the embossing in question. The type of embossing of each side of the extrudate may differ: for example, it is possible to use a first sandblasted roll (leading to the formation of a matt side) and a second roll etched with a regular pattern. The fact of not using a pressure roll consisting of or coated with an elastic material offers several advantages, in particular with regard to the quality of the simultaneous embossing of both sides of the extrudate, the possibility of precisely controlling the thickness of the extrudate, the absence of any risk of the extrudate sticking to the rolls, and the high and precise temperature which may be given to each of the two rolls, which contributes to the quality of the embossing. It is preferable for both rolls to be temperature conditioned (to identical or different temperatures), preferably to a temperature of between $T_c-5°$ C. and $T_f-5°$ C. This variant is particularly advantageous for the treatment of high-molecular-mass polyolefins (MFI less than 10 g/10 min, preferably less than 3 g/10 min, measured according to the ASTM D1238 standard, under a load of 2.16 kg at 190° C. for polymers containing at least 50% by weight of ethylene and at 230° C. for those containing at least 50% of propylene). Extrudates essentially consisting of these high-molecular-mass polyolefins are not generally embossable using the known processes, in particular because of their excessively high elasticity which leads to problems of thickness uniformity and embossment uniformity. They lend themselves particularly well to the production of articles for medical use, such as blood bags, fluid bags, bandages, etc. In these applications, they have the advantage of being sterilizable (at high temperature), without running the risk of them sticking to each other because of the surface embossment; furthermore, they are anti-blocking when cold.

Further details relating to the realization of this variant may be found in Belgium Patent Application No. 9500436 (EP 96201237.3) (Solvay).

This embossing step may be carried out at any moment between the extrusion of the extrudate and the relaxation step (3); however, for the purpose of not disturbing the embossment produced, it is preferable that at least 70% of the total drawing which the extrudate undergoes during the execution of the process of the invention take place before the embossing step. Particularly preferably, the embossing takes place between the drawing step (2) and the relaxation step (3). According to an advantageous subvariant, the relaxation (3) takes place at the surface of a roll which is one of the two embossing rolls.

In the 4th step (quenching), a second, very rapid, cooling further contributes to increasing the transparency. The quenching (4) consists of a sudden cooling, which takes place at a temperature $T_4$ of less than $T_c$, preferably less than $T_c-50°$ C., and particularly preferably less than $T_c-80°$ C. It is desirable for the duration of this cooling to be less than 3 s, preferably less than 1 s.

This quenching may especially be carried out by making the extrudate pass through a thermostatted water bath or over a chill roll. Simple air cooling to ambient temperature, generally applied in blown-film manufacturing processes, is not sufficiently rapid. Consequently, contrary to the present process, these processes lead to mediocre optical properties.

The rolls optionally used in the process of the invention preferably have a good surface finish. Advantageously, they are chromium-plated metal rolls.

The fact that the steps described above take place "in succession", does not mean that they are immediately consecutive. In other words, one or more other steps may be incorporated into the process described above, as long as they do not fundamentally affect the effects, this being applicable equally well before the above-mentioned steps, after them or between some of them. For example, if the extrudate is deposited on a chill roll (step 1) after it leaves the flat film die of an extruder, it is conventional to adjust the speed of rotation of this roll to a value such that it exerts a certain tension on the extrudate, so as to prevent the latter from creeping excessively. Since this "predrawing" takes place at a relatively high temperature, it has little effect on the orientation, the crystallinity, etc., of the thermoplastic, contrary to the drawing step (2) described above, which takes place at a lower temperature.

Likewise, in the case of the manufacture of a film, when the film is wound up after the quenching (4), the tension exerted on the film by this winding may have repercussions upstream of the quenching step (4) and also cause slight drawing of the film between steps (3) and (4), because the film is still at a high temperature. This possible slight drawing does not significantly affect the optical properties of the film. Nor does it significantly affect its mechanical properties (rigidity, etc.), as long as it does not exceed approximately 25%.

On the other hand, the term "in succession" does mean that the abovementioned steps are essentially separate in time and do not overlap. In particular, the cooling (1) and the drawing (2) do not take place simultaneously, contrary to what occurs in blown-film manufacturing processes.

The process of the invention gives excellent results when it is applied to the manufacture of a flat article, for example a film.

Although films based on homopolymer polypropylene (PP) are markedly less transparent than those based on propylene copolymers, at least when they are produced in a conventional manner, the process described above makes it possible, in particular, to manufacture films of homopolymer PP, with a thickness of approximately 200 $\mu$m, having a haze (measured according to the ASTM D 1003-95 standard) of less than or equal to 3% and a total transparency with respect to air (measured according to the ASTM D 1746-95 standard) of greater than 70%. Such optical properties are quite exceptional for a homopolymer-based film and can be compared favourably with copolymer-based films.

This is why another subject of the present invention is a film essentially consisting of at least one propylene homopolymer, with a thickness of from 100 to 250 $\mu$m, having a hot shrinkage of at most 20%, a haze of less than or equal to 3% and a total transparency with respect to air of greater than 70%, which is capable of being manufactured by means of the abovementioned process. The hot shrinkage denotes the shrinkage measured after a period of 30 minutes in a ventilated oven at a temperature of $T_f-25°$ C. The presence of a limitation regarding the shrinkage is due to the fact that, among all known homopolymer-PP-based films, those which are (biaxially) oriented using a conventional technique, i.e. in the solid state, may indeed have similar optical properties, but their hot shrinkage (defined as being $(L_0-L_1)/L_1$, where $L_0$ and $L_1$ respectively denote the length before and after shrinkage) is then considerable, often very significantly greater than 100%.

The film thus defined includes at least 95% by weight of at least one propylene homopolymer with respect to the total weight of the thermoplastics, and optionally one or more other conventional polymers and/or additives. However, it is noteworthy that the abovementioned optical properties can be obtained, in particular, when the film is free of nucleating additives, such as talc, etc.

The film thus defined comprises a single layer; however, it may, of course, be combined, using conventional techniques such as, for example, laminating or extrusion coating, with one or more other layers of thermoplastic and/or also with substrates of another kind.

According to an advantageous variant of the invention, a thin sealing layer is associated with the films obtained according to the process described above. This is because, in some applications, such as the manufacture of bags intended to contain blood or other liquids for medical use, it is necessary to weld two films together easily and reliably, i.e. without causing local degradation of the mechanical performance thereof, and to produce a strong weld. In particular, liquid-containing bags for medical use must generally be able to withstand being sterilized and possibly being dropped after they have been filled, without the strength of the welds being affected. When such articles are manufactured from monolayer films, it is observed that high-temperature sterilization greatly reduces the strength, especially the impact strength, of the welds.

It has been found that this problem could be solved by using a sealing layer having specific properties.

This is why an advantageous variant of the present invention relates to a process as described above, applied to the manufacture of a multilayer film, in which the extrudate subjected to the abovementioned steps includes at least two layers, one forming the main layer (A) of the film and another, external layer being a sealing layer (B) which has a thickness of less than that of the main layer (A) and the thermoplastic of which it is composed has a melting point and a melt flow index which are respectively less than and at least twice as great as those of the thermoplastic of which the main layer (A) is composed. This variant may be produced by any known technique, for example by using a coextrusion die fed by at least two separate extruders.

Typically, the sealing layer (B) has a thickness equal to at least 5% of that of the main layer (A). Moreover, its thickness generally is less than 40% and preferably less than 20% of that of the main layer (A). In absolute values, it is preferred for the thickness of the sealing layer to be at least 5 μm, in particular at least 20 μm.

The thermoplastic of which the main layer (A) is composed satisfies on all points the definition of the thermoplastic given in the general definition of the process, including with regard to its preferred variants. It should be noted that in the present variant the various parameters ($T_c$, $T_f$, etc.) mentioned in the said general definition refer specifically to the thermoplastic of which the main layer (A) is composed.

Another simple variant consists of a process as defined above, applied to the manufacture of a multilayer film, furthermore including an extrusion-coating or laminating step, after the quenching step (4), by which the film obtained (A) is provided with a sealing layer (B), the thermoplastic of which it is composed having a melting point and a melt flow index which are respectively less than and at least twice as great as those of the thermoplastic of which the main layer (A) is composed.

The melt flow indices are measured according to the ISO R1133 standard (1981 version), under the usual conditions depending on the materials in question.

Any thermoplastic satisfying the abovementioned conditions can be used as a constituent of the sealing layer (B). Preferably, this is a polymer or polymer blend compatible with the main layer (A), thereby making it possible to avoid using an adhesive interlayer. Good results have been obtained when the thermoplastic of which the sealing layer (B) is composed includes at least one α-olefin copolymer, in particular an ethylene-propylene (E/P) copolymer, preferably an E/P copolymer with proportions by weight of from 1/99 to 8/92.

The thermal properties of the sealing layer (B) ensure that only the latter layer melts during welding; the operation is more rapid and the welds have greater impact strength. Advantageously, the melting point of the thermoplastic of which the sealing layer (B) is composed is at least 10° C., and preferably at least 20° C., less than that of the thermoplastic of which the main layer (A) is composed. Advantageously, the melt flow index of the thermoplastic of which the sealing layer (B) is composed is at least twice as great, preferably at least four times as great, as that of the thermoplastic of which the main layer (A) is composed (under the abovementioned measurement conditions).

If necessary, the flexibility of the resulting multilayer film may be increased when the thermoplastic of which the main layer (A) is composed and/or the thermoplastic of which the sealing layer (B) is composed include at least one copolymer which is compatible with its other constituent or constituents and which is capable of increasing the flexibility of this layer (B). Preferably, at least one block copolymer of the styrene-ethylene-butadiene-styrene (SEBS) type (for example, the product KRATON® 1657 from Shell) or of the styrene-ethylene-propylene-styrene (SEPS) type is used. Advantageously, the weight content of this copolymer within the layer (B) is from 10 to 40%.

In addition to the main layer and the sealing layer, the film may optionally also include one or more other layers based on one or more thermoplastics.

The following examples illustrate non-limitingly the advantages of the process and of the film of the invention.

EXAMPLE 1

Homopolymer-based Monolayer film

A homopolymer polypropylene, ELTEX® P HL402 (Solvay), ($T_c$=110° C., $T_f$=158° C., average relaxation time $\tau_0$=0.6 s (before drawing), with a thickness of 1.5 mm and a width of 60 cm, is extruded by means of a single-screw extruder (temperatures from 160 to 230° C.) equipped with a flat film die (temperature 230° C.) (material temperature 235° C.). This extrudate is drawn 200% at the die exit and is then deposited on a roll whose temperature, maintained by circulating water, is equal to 135° C. and the peripheral velocity of which is 2.5 m/min. The extrudate remains in contact with this roll for 10 s, enabling it to be cooled uniformly. Next, it is drawn by a factor of 3 due to the effect of the rotation of the following roll, also maintained at 135° C. but rotating with a peripheral velocity of 7.5 m/min (i.e. a contact length of approximately 25 cm). The extrudate remains on this roll for approximately 2 seconds (i.e. over a length of 25 cm), which enables the tensions generated by the low-temperature drawing to be significantly relaxed. Next, it is drawn a further 20% before being quenched in a 10° C. water bath and wound up at a speed of 9 m/min. Its final thickness is 200 μm.

The film thus obtained has a haze of 3% (ASTM D 1003 standard), a gloss of 88% (ASTM D 2457 standard) and a total transparency with respect to air of 85% (ASTM D 1746 standard), something which is exceptional.

Welds (welding conditions: temperature=140° C., pressure=10 bar, duration=1 s), which are annealed at 121° C. for 30 minutes, do not withstand a tensile test carried out at 23° C. and 500 cm/min (failure of the weld without plastic deformation of the sample).

EXAMPLE 2

Multilayer Film

An extrudate with a thickness of 1.5 mm and a width of 45 cm, composed of a main layer of homopolymer polypropylene ELTEX P HL402 described above, and of a sealing layer made of an ethylene-propylene copolymer (with proportions by weight of 3.3/96.7) ELTEX KS 413 ($T_c$=95° C., $T_f$=137° C.), is extruded by means of a multi-channel coextrusion flat die (temperature 230° C.) fed by two single-screw extruders (the barrel temperatures of which increase steadily from 160 to 230° C.) with a material temperature of 235° C. Next, similar to Example 1, this extrudate is drawn 200% and then deposited on a roll maintained at 130° C. and rotating with a peripheral velocity of 2.5 m/min, with which roll it remains in contact for 10 s. Next, the extrudate is drawn by a factor of 3 by virtue of the tension exerted by the following roll, also maintained at 130° C. but rotating with a peripheral velocity of 7.5 m/min. The extrudate remains on this roll and relaxes thereon for approximately 2 seconds (i.e. over a length of approximately 25 cm). Next, it is drawn further, quenched and wound up, as in Example 1. Its final thickness is 200 μm (the sealing layer of which represents 20 μm).

The film thus obtained has a haze of 2.9%, a gloss of 74% and a total transparency with respect to air of 71% (these being measured according to the abovementioned standards).

Welds produced and annealed as in Example 1 this time resist the same tensile test (plastic deformation of the sample outside the weld, with no failure of the weld).

EXAMPLE 3

Copolymer-based Monolayer Film

An extrudate, approximately 1.5 mm in thickness and 60 cm in width, consisting of an ethylene-propylene copolymer (with proportions by weight of 2.7/97.3), ELTEX P KL104 ($T_c$=95° C.; $T_f$=145° C.; $\tau_0$≈0.5 s (before drawing)) is extruded at a temperature of 220° C. by means of a single-screw extruder provided with a flat film die. This extrudate is drawn 200% at the die exit and is then deposited on a roll which is maintained at 125° C. by water circulation and the peripheral velocity of which is 5 m/min. The extrudate, which then has a thickness of approximately 700 μm, remains in contact with this roll for 4.5 s. Next, it is drawn by a factor of 3 under the effect of the following roll, also maintained at 125° C. but rotating with a peripheral velocity of 15 m/min. The extrudate remains in contact with this roll and relaxes thereon for approximately 1 s (i.e. over a length of approximately 25 cm) before being quenched in a 10° C. water bath and wound up at a speed of 17 m/min.

The film thus obtained has a haze of 1.3%, a gloss of 91% and a total transparency with respect to air of 60% (these being measured according to the abovementioned standards).

The table which follows summarizes the main operating conditions for the various examples, as well as the properties of the films obtained.

| | Examples ® | 1 | 2 | 3 |
|---|---|---|---|---|
| Nature of the extrudate | Material | PP | 2 layers: PP + E/P copol | E/P copol |
| | $T_c$ (0 C.) | 110 | PP: 110  copol: 95 | 95 |
| | $T_f$ (0 C.) | 158 | PP: 158  copol: 137 | 145 |
| | $t_0$ (s) | 0.6 | PP: 0.6 | 0.5 |
| Extrusion | Temperature (0 C.) | 235 | 235 | 220 |
| Cooling (1) | Temperature (0 C.) | 135 | 130 | 125 |
| | Duration (s) | 10 | 10 | 4.5 |
| Drawing (2) | Factor | 3 | 3 | 3 |

-continued

| | Examples ® | 1 | 2 | 3 |
|---|---|---|---|---|
| Relaxation (3) | Temperature (0 C.) | 135 | 130 | 125 |
| | Duration (s) | 2 | 2 | 1 |
| Quenching (4) | Temperature (0 C.) | 10 | 10 | 10 |
| | Duration (s) | 0.04 | 0.04 | 0.04 |
| Properties of the film obtained | Thickness (mm) | 200 | 200 | 200 |
| | Haze (%) | 3 | 2.9 | 1.3 |
| | Gloss (%) | 88 | 74 | 91 |
| | Transparency (%) | 85 | 71 | 60 |

What is claimed is:

1. Process for processing a semicrystalline thermoplastic, which includes, in succession, the following steps:
    (1) a molten semicrystalline thermoplastic extrudate is cooled to a temperature $T_1$ which is greater than the crystallization temperature ($T_c$) of the thermoplastic and is less than $T_f$+5° C., $T_f$ denoting the melting point of the thermoplastic;
    (2) next, the extrudate is drawn in the molten state;
    (3) next, the extrudate is relaxed, at a temperature $T_3$ which is between $T_c$ and $T_f$, for a duration of at least equal to the average relaxation time ($\tau_3$) of the thermoplastic at the relaxation temperature and after the drawing;
    (4) next, the extrudate is quenched to a temperature $T_4$ which is less than $T_c$.

2. Process according to claim 1, which furthermore includes, prior to the relaxation step (3), a step of embossing the extrudate, in which the latter is pinched between two metal rolls.

3. Process according claim 1, in which the draw ratio during step (2) is at least 200%.

4. Process according to claim 1, wherein the extrudate is a flat film.

5. Process according to claim 4, wherein the extrudate is a multilayer film, in which the extrudate includes at least two layers, one forming the main layer (A) of the film and another, external layer being a sealing layer (B) which has a thickness less than that of the main layer (A) and the thermoplastic of which it is composed has a melting point and a melt flow index which are respectively less than and at least twice as great as those of the thermoplastic of which the main layer (A) is composed.

6. Process according to claim 4, wherein the extrudate is a multilayer film, which furthermore includes, after the quenching step (4), an extrusion-coating or laminating step by means of which the film obtained (A) is provided with a sealing layer (B), the thermoplastic of which this sealing layer is composed having a melting point and a melt flow index which are respectively less than and at least twice as great as those of the thermoplastic of which (A) is composed.

7. Process according to claim 5, in which the thermoplastic of which the sealing layer (B) is composed includes at least one α-olefin copolymer.

8. Process according to claim 5, in which the thermoplastic of which the main layer (A) is composed and/or the thermoplastic of which the sealing layer (B) is composed include at least one copolymer which is compatible with its other constituent or constituents and which is capable of increasing the flexibility of this layer (B).

* * * * *